US011188367B2

(12) United States Patent
Patil

(10) Patent No.: US 11,188,367 B2
(45) Date of Patent: Nov. 30, 2021

(54) GUEST OPERATING SYSTEM PHYSICAL MEMORY PAGE PROTECTION USING HYPERVISOR

(71) Applicant: NICIRA, INC., Palo Alto, CA (US)

(72) Inventor: Sukrut Patil, Pune (IN)

(73) Assignee: NICIRA INC., Palo Alto, CA (US)

( * ) Notice: Subject to any disclaimer, the term of this patent is extended or adjusted under 35 U.S.C. 154(b) by 118 days.

(21) Appl. No.: 15/867,757

(22) Filed: Jan. 11, 2018

(65) Prior Publication Data

US 2019/0056968 A1 Feb. 21, 2019

(30) Foreign Application Priority Data

Aug. 21, 2017 (IN) .............................. 201741029593

(51) Int. Cl.
*G06F 9/455* (2018.01)
*G06F 21/52* (2013.01)
*G06F 21/79* (2013.01)

(52) U.S. Cl.
CPC .......... *G06F 9/45558* (2013.01); *G06F 21/52* (2013.01); *G06F 21/79* (2013.01); *G06F 2009/45575* (2013.01); *G06F 2009/45583* (2013.01); *G06F 2009/45591* (2013.01); *G06F 2221/2105* (2013.01)

(58) Field of Classification Search
None
See application file for complete search history.

(56) References Cited

U.S. PATENT DOCUMENTS

| | | | | |
|---|---|---|---|---|
| 5,581,722 A * | 12/1996 | Welland | ............... | G06F 12/023 711/206 |
| 6,345,351 B1 * | 2/2002 | Holmberg | ........... | G06F 12/1036 711/203 |
| 2002/0019887 A1 * | 2/2002 | Moore | ...................... | G06F 9/46 719/328 |
| 2011/0082962 A1 * | 4/2011 | Horovitz | ............... | G06F 11/301 711/6 |
| 2012/0324236 A1 * | 12/2012 | Srivastava | ............. | G06F 21/57 713/189 |
| 2013/0031291 A1 * | 1/2013 | Edwards | ............... | G06F 21/554 711/6 |
| 2013/0091318 A1 * | 4/2013 | Bhattacharjee | ..... | G06F 12/1475 711/6 |
| 2013/0125119 A1 * | 5/2013 | Vipat | ...................... | G06F 21/53 718/1 |
| 2014/0304720 A1 * | 10/2014 | Yu | ....................... | G06F 9/44521 719/331 |
| 2017/0250817 A1 * | 8/2017 | Bonzini | ............... | H04L 9/3247 |
| 2018/0247069 A1 * | 8/2018 | Tang | ...................... | G06F 21/52 |

* cited by examiner

*Primary Examiner* — Meng Ai T An
*Assistant Examiner* — Zujia Xu
(74) *Attorney, Agent, or Firm* — Su IP Consulting

(57) ABSTRACT

A method is provided for a protection module or a process to use a hypervisor to protect memory pages of a guest operating system on the hypervisor. The method includes modifying a shared memory page in a context of the process, which causes the guest operating system to allocate a private memory page to the process, copy data from the shared memory page to the private memory page, and modify the private memory page. The method further includes causing the hypervisor to protect the private memory page by monitoring the private memory page and generating an alert when the private memory page is accessed.

12 Claims, 2 Drawing Sheets

GUEST OPERATING SYSTEM PHYSICAL MEMORY PAGE PROTECTION USING HYPERVISOR

RELATED APPLICATIONS

Benefit is claimed under 35 U.S.C. 119(a)-(d) to Foreign Application Serial No. 201741029593 filed in India entitled "SECURING USER MODE PROCESS USING HYPERVISOR", on Aug. 21, 2017, by NICIRA, INC., which is herein incorporated in its entirety by reference for all purposes

BACKGROUND

In a computer running an operating system (OS) such as Windows or Linux, a processor has a user mode and a kernel mode. The processor switches between the two modes (a mode switch) depending on what type of code is running on the processor. Applications run in user mode, and core OS components run in kernel mode.

When a user-mode application starts, the OS provides the process (an executing instance of the application) with a private virtual address space and a private handle table so every process has its own address space. The processor switches between the processes (a context switch) to read and write the memory assigned to the processes. In other words, the processor has to be in the context of a process to correctly read and write the address space of that process.

User-mode processes are vulnerable to malware attacks where malware uses different code hooking techniques to alter the execution flow of a process. Although an OS provides some protection against modification by making some user-mode pages read only, there are application programming interfaces (APIs) that can be used to turn off this protection.

DETAILED DESCRIPTION

Figure 1:
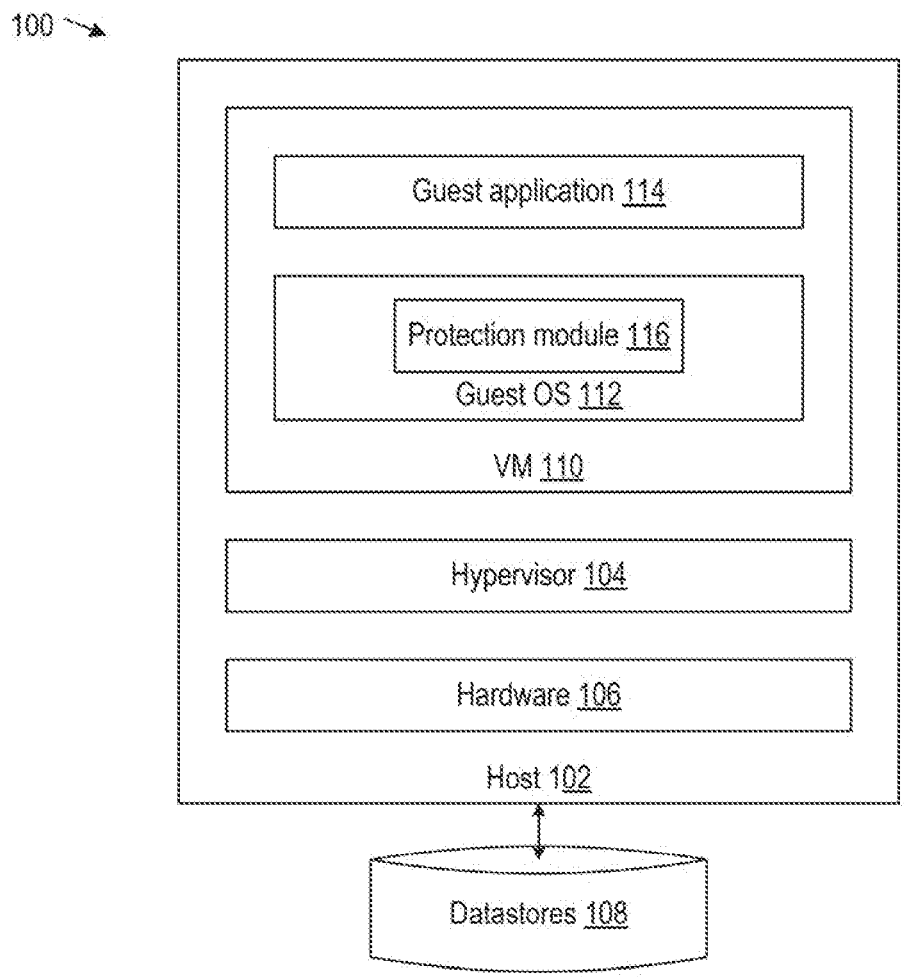
FIG. 1 is a block diagram of a virtualized computing environment in examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Copy-on-write protection is an optimization that allows an operating system (OS) to map virtual address spaces of multiple user-mode processes so they share a physical memory page until one of the processes modifies the page. This is part of a technique called lazy evaluation, which allows the OS to conserve physical memory and time by not performing an operation until absolutely necessary.

For example, suppose two processes load pages from the same DLL into their virtual memory spaces. The OS maps these virtual memory pages to the same physical memory pages for both processes. As long as neither process writes to their virtual memory pages, they can map to and share the same physical memory pages.

If a first process writes to one of its virtual memory pages, the OS copies the contents of the shared physical memory page to a private physical memory page and updates the virtual memory map for the first process. Both processes now have their own instance of the page in physical memory. Therefore, it is not possible for one process to write to a shared physical memory page and for the other process to see the changes.

VMware's hypervisor includes a security feature that monitors physical memory pages of a guest OS and sends an alert to a driver in the guest OS when the protected page is accessed (e.g., read, written, executed, or a combination thereof).

The guest OS can mark some physical memory pages of user-mode processes, such as code pages, shared code pages, and some data pages, as copy-on-write. If the hypervisor places an alert on such a page, the hypervisor does not detect any access to the page as the guest OS makes a copy of the page and modifies the copied page instead of the original page. Thus, what are needed are method and apparatus to protect physical memory pages of a guest OS using a hypervisor's alert feature even when the guest OS marks these pages as copy-on-write.

In examples of the present disclosures, a protection module or a process modifies shared memory pages in the context of the process before the process executes. The protection module may modify the shared pages by reading their contents and writing the same contents back to their original locations in these pages. On modification, a guest OS makes a copy of the shared pages and redirects all references of the original pages to newly copied private pages. The protection module causes a hypervisor to monitor these newly modified private pages so the hypervisor would alert the protection module sets when one of these pages is accessed for read, write, execute, or some combination thereof. The protection module then allows the process to execute.

FIG. 1 is a block diagram of a virtualized computing environment 100 in examples of the present disclosure. Environment 100 includes a host computer 102, also referred to as a host. Host 102 runs a hypervisor 104 to create and run virtual machines (VMs). Host 102 includes suitable hardware 106 (physical memory, processor, local storage, and network interface cards) to support the VMs. Host 102 stores the VM data in a datastore 108.

A VM 110 represents a software implementation of a physical machine. Virtual resources are allocated to VM 110 to support a guest OS 112 running on the VM and a guest application 114 running on the guest OS. Corresponding to hardware 106, the virtual resources may include virtual memory, virtual processor, virtual local storage, and virtual network interface cards.

Guest OS 112 may be implemented using any suitable operating system, such as Microsoft Windows, Linux, etc. Guest OS 112 may include a protection module 116 implemented as kernel-mode driver.

Figure 2:
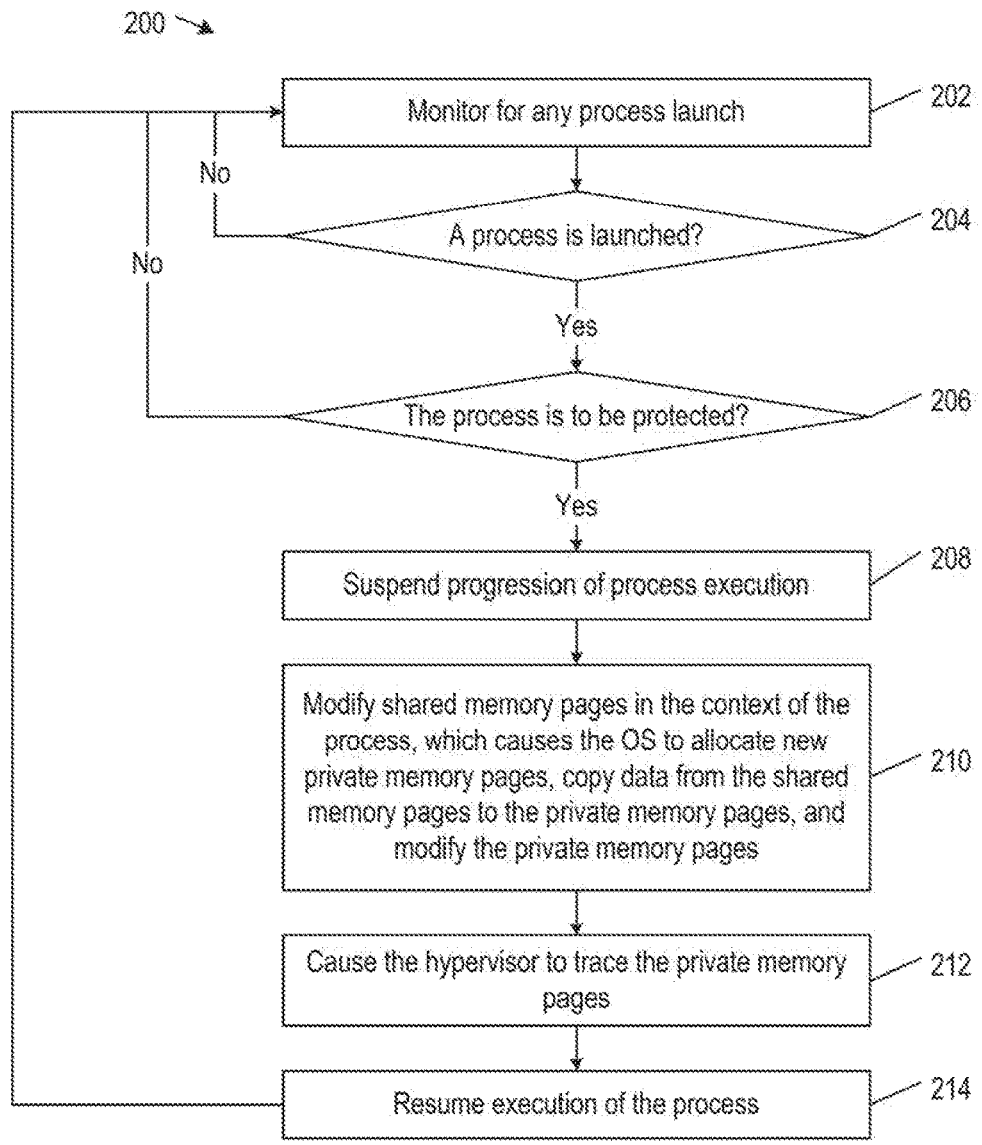
FIG. 2 is a block diagram of a method for a protection module of FIG. 1 to use a hypervisor of FIG. 1 to protect physical memory pages of a guest operating system of FIG. 1 on the hypervisor in examples of the present disclosure.

FIG. 2 is a block diagram of a method 200 for protection module 116 (FIG. 1) to use hypervisor 104 (FIG. 1) to protect memory pages of guest OS 112 (FIG. 1) on the hypervisor in examples of the present disclosure. Method 200, and any method described herein, may be implemented as instructions encoded on a computer-readable medium that is to be executed by a processors in a computer system. Method 200, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 200 may begin in block 202.

In block 202, protection module 116 monitors for process creation/launch event. For example, protection module 116 registers with guest OS 112 for a load-image notification or a process creation notification so that the guest OS notifies the protection module whenever an image is loaded into the physical memory of the guest OS. Block 202 may be followed by block 204.

In block 204, protection module 116 determines if a process has been launched. If so, block 204 may be followed by block 206. Otherwise block 204 may loop back to block 202. A process has been launched when guest OS 112 calls back protection module 116 with a load-image or process creation notification.

In block 206, protection module 116 determines if the process is one of the processes the protection module is to protect. If so, block 206 may be followed by block 208. Otherwise block 206 may loop back to block 202. Protection module 116 first determines if the load-image notification maps to a user-mode image. This may be determined from a parameter in the load-image or process creation notification. If so, protection module 116 determines if the user-mode image corresponds to one of the to-be-protected user-mode processes. This again may be determined from a parameter in the load-image or process creation notification.

In block 208, protection module 116 suspends progression of process execution. Block 208 may be followed by block 210.

In block 210, protection module 116 modifies one or more shared physical memory pages of guest OS 112 in the context of the process by writing virtual memory pages of the process that map to the shared physical memory pages of the guest OS. The shared physical memory pages contain code of the process or a dependent shared library of the process. Protection module 116 may select to modify less than all of the shared physical memory pages.

Protection module 116 modifies the shared memory pages in the context of the process in several ways.

In some examples, protection module 116 first walks the process's page table and modify the page permissions to allow the protection module to write to its virtual memory pages. Protection module 116 then reads data from the virtual memory pages of the process and writes the same data back to their original locations in the pages. This causes guest OS 112 to allocate new private physical memory pages, copy data from the shared physical memory pages to the new private physical memory pages, and modify the new private physical memory pages with existing (same) data. The new private physical memory pages are therefore identical to the original physical memory pages.

In some examples, protection module 116 uses an asynchronous procedure call (APC) to inject a security module implemented as a dynamic link library (dll) in the process. The security module dll executes to read data from the virtual memory pages of the process and write the same data back to their original locations in the pages. Again, this causes guest OS 112 to perform COW on the shared physical memory pages.

In some examples, protection module 116 modifies the entry point of the image of the process. Protection module 116 first determines an entry point of the image where execution of the process starts and modifies the entry point with code to redirect calls to the production module. When a call is made to the entry point (e.g., from the kernel-mode input/output (I/O) manager in the guest OS), the modified entry point redirects the call to protection module 116, which then reads data from the virtual memory pages of the process and writes the same data back to their original locations in the pages. Again, this causes guest OS 112 to perform COW on the shared physical memory pages.

In some examples, the process itself is aware of and communicates with protection module 116 through a kernel mode communication channel. The process changes the page permissions to allow it to write to its virtual memory pages. The process then reads data from its virtual memory pages and writes the same data back to their original locations in the pages. Again, this causes guest OS 112 to perform COW on the shared physical memory pages. The process then informs protection module 116 to place an alert on the new private physical memory pages mapped to its virtual memory pages.

Block 210 may be followed by block 212.

In block 212, after modification is complete, protection module 116 causes hypervisor 104 to place an alert on the new private physical memory pages. Block 212 may be followed by block 214.

In block 214, protection module 116 resumes the execution of the process. Block 214 may loop back to block 202.

Figure 3:
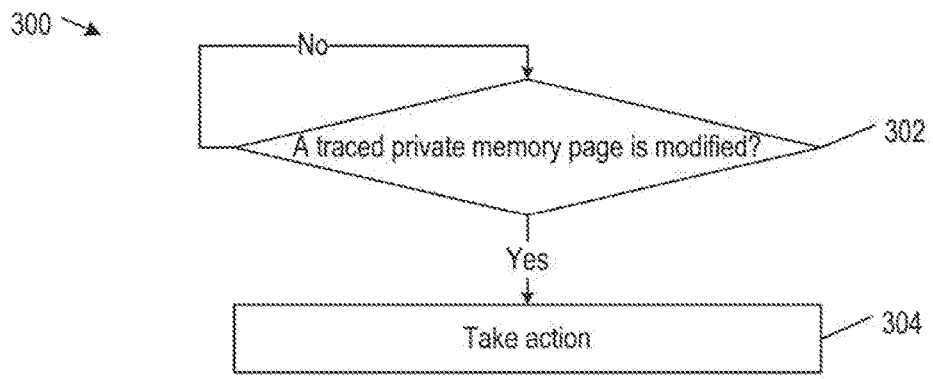
FIG. 3 is a block diagram of a method for the protection module of FIG. 1 to handle a protected page that has been modified in examples of the present disclosure.

FIG. 3 is a block diagram of a method 300 for protection module 116 (FIG. 1) to handle a protected page that has been modified in examples of the present disclosure. Protection module 116 may perform methods 200 (FIG. 2) and 300 sequentially or in parallel. Method 300 may begin in block 302.

In block 302, protection module determines if any protected private physical memory page of guest OS 112 has been accessed (e.g., modified). For example, protection module determines if it has received any alert from hypervisor 104 indicating a protected private physical memory page of guest OS 112 has been accessed. If so, block 302 may be followed by block 304. Otherwise block 302 loops back to itself.

In block 304, protection module 116 takes action in response to the modification of a protected physical memory page. For example, protection module 116 may stop the process and alert an administrator regarding the possible security breach.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for a protection module associated with a kernel-mode driver in a guest operating system to use a hypervisor to protect memory pages of the guest operating system, the method performed by the protection module comprising:

monitoring for a launch of a user-mode process;

determining if the user-mode process is to be protected once the user-mode process launches, based on a parameter in a load-image or a process creation notification;

pausing execution of the user-mode process when the user-mode process is to be protected while the protection module is running;

modifying a shared physical memory page in a context of the user-mode process by writing to a virtual memory page of the user-mode process that maps to the shared physical memory page, which causes the guest operating system to allocate a private physical memory page to the user-mode process, copy data from the shared physical memory page to the private physical memory page, and modify the private physical memory page with existing data on the shared physical memory page, wherein another virtual memory page of another process, which differs from the user-mode process, is also mapped to the shared physical memory page, and the private physical memory page modified with the existing data is identical to the shared physical memory page;

causing the hypervisor to protect the private physical memory page by monitoring the private physical memory page and generating an alert when the private physical memory page is accessed by any process; and resuming execution of the user-mode process after said causing the hypervisor to protect the private physical memory page.

2. The method of claim 1, further comprising:

receiving the alert that the private physical memory page is being modified; and taking an action in response to receiving the alert.

3. The method of claim 1, wherein modifying the shared physical memory page in the context of the user-mode process comprises:

modifying page permission to allow the protection module to write to the virtual memory page of the user-mode process mapped to the shared physical memory page; and modifying the virtual memory page of the user-mode process.

4. The method of claim 1, wherein modifying the shared physical memory page in the context of the user-mode process comprises using an asynchronous procedure call to inject a dynamic link library in the user-mode process, the dynamic link library causing a write to the shared physical memory page.

5. The method of claim 1, wherein modifying the shared physical memory page in the context of the user-mode process comprises modifying an entry point of the user-mode process of redirect a call to the protection module, the protection module causing a write to the shared physical memory pages in response to the call.

6. The method of claim 1, wherein modifying the shared physical memory page comprises reading data from a location of the virtual memory page of the user-mode process and writing the same data back to the location of the virtual memory page of the user-mode process.

7. A non-transitory, computer-readable storage medium encoded with instructions executable by a processor to implement a protection module associated with a kernel-mode driver in a guest operating system that uses a hypervisor to protect memory pages of the guest operating system, which in response to the protection module executing the instructions, cause the processor to:

monitor for a launch of a user-mode process;

determine if the user-mode process is to be protected once the user-mode process launches, based on a parameter in a load-image or a process creation notification;

pause execution of the user-mode process when the user-mode process is to be protected while the protection module is running;

modify a shared physical memory page in a context of the user-mode process by writing to a virtual memory page of the user-mode process that maps to the shared physical memory page, which causes the guest operating system to allocate a private physical memory page to the user-mode process, copy data from the shared physical memory page to the private physical memory page, and modify the private physical memory page with existing data on the shared physical memory page, wherein another virtual memory page of another process, which differs from the user-mode process, is also mapped to the shared physical memory page, and the private physical memory page modified with the existing data is identical to the shared physical memory page;

cause the hypervisor to protect the private physical memory page by monitoring the private physical memory page and generating an alert when the private physical memory page is accessed by any process; and resume execution of the user-mode process after said causing the hypervisor to protect the private physical memory page.

8. The storage medium of claim 7, wherein the storage medium further comprises additional instructions, which in response to the protection module executing the instructions, cause the processor to:

receive the alert that the private physical memory page is being modified; and take an action in response to receiving the alert.

9. The storage medium of claim 7, wherein the instructions for modifying the shared physical memory page in the context of the user-mode process, which in response to the protection module executing the instructions, cause the processor to:

modify page permission to allow the protection module to write to the virtual memory page of the user-mode process mapped to the shared physical memory page; and modify the virtual memory page of the user-mode process.

10. The storage medium of claim 7, wherein the instructions for modifying the shared physical memory page in the context of the user-mode process, which in response to the protection module executing the instructions, cause the processor to:

use an asynchronous procedure call to inject a dynamic link library in the user-mode process, the dynamic link library causing a write to the shared physical memory page.

11. The storage medium of claim 7, wherein the instructions for modifying the shared physical memory page in the context of the user-mode process, which in response to the protection module executing the instructions, cause the processor to:

modify an entry point of the user-mode process of redirect a call to the protection module, the protection module causing a write to the shared physical memory pages in response to the call.

12. The storage medium of claim 7, wherein the instructions for modifying the shared physical memory page, which in response to the protection module executing the instructions, cause the processor to:
 read data from a location of the virtual memory page of the user-mode process and writing the same data back to the location of the virtual memory page of the user-mode process.

\* \* \* \* \*